United States Patent
Krishnan et al.

(10) Patent No.: US 7,318,215 B1
(45) Date of Patent: Jan. 8, 2008

(54) STORED PROCEDURE INTERFACE LANGUAGE AND TOOLS

(75) Inventors: Murali R. Krishnan, Redmond, WA (US); Tao Huang, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 634 days.

(21) Appl. No.: 10/375,851

(22) Filed: Feb. 26, 2003

(51) Int. Cl.
*G06F 9/44* (2006.01)
*G06F 7/00* (2006.01)

(52) U.S. Cl. ...................... 717/106; 707/102
(58) Field of Classification Search ................. 717/106
See application file for complete search history.

(56) References Cited

U.S. PATENT DOCUMENTS

| | | | |
|---|---|---|---|
| 5,493,615 A * | 2/1996 | Burke et al. ................ | 381/71.5 |
| 5,613,117 A * | 3/1997 | Davidson et al. ........... | 717/144 |
| 5,659,753 A * | 8/1997 | Murphy et al. ............. | 717/147 |
| 6,067,414 A * | 5/2000 | Wang et al. ................ | 717/106 |
| 6,305,012 B1 | 10/2001 | Beadle et al. | |
| 6,327,702 B1 | 12/2001 | Sauntry et al. | |
| 6,385,769 B1 * | 5/2002 | Lewallen .................... | 717/125 |
| 6,460,043 B1 | 10/2002 | Tabbara et al. | |
| 6,591,272 B1 * | 7/2003 | Williams .................... | 707/102 |
| 6,772,205 B1 * | 8/2004 | Lavian et al. ............... | 709/223 |

OTHER PUBLICATIONS

Garth, "Generating ADO Parameters with Information Schema Views," Dec. 10, 2001, www.sqlteam.com.
Oracle Technical White Paper, "Developing Stored Procedures in Java," Apr. 1999.

\* cited by examiner

*Primary Examiner*—Wei Zhen
*Assistant Examiner*—Chih-Ching Chow
(74) *Attorney, Agent, or Firm*—Amin, Turocy & Calvin, LLP

(57) ABSTRACT

The present invention relates to systems and methods to generate stored procedure calling code. The invention includes system and methods that utilize annotation(s) included in a stored procedure. The annotations comprise attributes that indicate the intent to have stored procedure calling code generated. After the annotated stored procedure becomes available, the code is compiled and, optionally, checked for errors, and an intermediate definition with metadata is created. The definition is a stored procedure interface language (SPIL) file. The SPIL definition is then utilized to generate high-level, stored procedure calling code, or class libraries. The high level code can then be employed within an application to invoke the stored procedure.

36 Claims, 11 Drawing Sheets

| ATTRIBUTE NAME — 410 | ATTRIBUTE PARAMETER(S) — 420 | DESCRIPTION — 430 |
|---|---|---|
| METHOD | NONE | REQUEST GENERATION OF METHOD |
| CLASS | CLASS NAME | GENERATE METHOD INSIDE OF SPECIFIED CLASS |
| RIGHTS | PRIVILEGE | READ AND/OR WRITE ACCESS |
| PartitionBy | ALGORITHM OR PARTITION IDENTIFIER | SPECIFIC LOGICAL PARTITION |
| PartitionAll | NONE | SPECIFY ALL PARTITION(S) |
| PartitionAny | NONE | ANY PARTITION |
| CALL BY IDENTIFICATION | NONE | SPECIFIC INSTANCE |

FIG. 4

STORED PROCEDURE INTERFACE LANGUAGE AND TOOLS

TECHNICAL FIELD

The present invention relates generally to databases, and more particularly to systems and methods for generation of executable instruction(s) employed to invoke a stored procedure associated with a database.

BACKGROUND OF THE INVENTION

As computing and networking technologies become robust, secure and reliable, more consumers, wholesalers, retailers, and information providers are employing the Internet to conduct business. For example, many wholesalers and information providers are providing web sites and/or on-line services for purchasing products and searching for information, respectively.

Typically, business over the Internet includes a user interfacing with a client application (e.g., a web page) to interact with a server that stores information in database(s) that are accessible to the client application. For example, a stock market web site can provide the user with tool(s) for retrieving stock quotes and purchasing stocks. The user can type in a stock symbol, and then request a stock quote. The client application queries database table(s) of stocks, for example, and returns a stock quote. The user can submit a request to purchase the stock through the client application. The actual stock purchase is dependent on the provider's policy, and the date and time of the request.

In general, the server can be associated with one or more databases and can comprise a complex and large volume of data and executable code. The typical business (wholesaler, retailer, etc.) offering the service is not staffed with employees with the technical background and experience to construct the databases, write the executable code and/or build the client application. Generally, the business out-sources the effort to a third party vendor, for example, for a fee. The vendor can then employ various programming philosophies to develop and efficiently provide the business with a reliable and cost effective system.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods to utilize an annotated stored procedure to generate executable code (e.g., automatically) and associated runtime libraries to call the stored procedure without having to program additional code to call the stored procedure.

The systems and methods generally include component(s) (associated with stored procedure interface language and tools) interfaced with a database, for example a SQL-based database, to access an annotated stored procedure. In general, a stored procedure is a precompiled collection of statements stored under a name on server and processed as a unit. The annotation comprises attributes, or metadata, to allow a developer to indicate whether to export and/or bind a method, for example. The system and methods utilize the annotation to generate an intermediate stored procedure interface language (SPIL) definition, and subsequently generate high-level code and libraries (e.g., C, C++, C#, Jscript-.net, VB.net, Perl.net) associated with the stored procedure. The high-level code can be accessed via an application, wherein a call to the generated code calls the stored procedure in the database.

Conventionally, a developer write a stored procedure(s), and transfers (e.g., upload) the code to a database. Typically, the code comprises one or more files that are individually and/or batch uploaded to the database. The developer then develops the infrastructure (e.g., code) to call the stored procedure(s). Writing the code to call the stored procedure is generally time intensive, and includes development, debugging and testing efforts.

The developer enters a cycle of writing the stored procedure, saving it to a database, writing a stored procedure call, and debugging and testing the call to provide additional behaviors. Presently, a typical platform can include more than five hundred stored procedures. Hence, about five hundred or more individual cycle iterations may have to occur to provide stored procedure calling code. Thus, manually developing the calling code for the stored procedures can consume considerable research and development resources and cost, with minimal relative return (e.g., reusability).

The present invention mitigates developing, debugging and testing code to call a stored procedure via generating (e.g., automatically) the stored procedure calling code. The developer, while writing the stored procedure, includes in-line annotations that facilitate code generation. Then, a tool and/or method in accordance with an aspect of the invention can be employed to utilize the annotations from the stored procedure and generate stored procedure calling code. Thus, the present invention reduces development time and improves development efficiency.

Furthermore, the present invention provides compile-time error checking, which generally is not employed. Conventionally, the stored procedure is merely referenced during compilation. Parameter and/or partitioning mismatch, for example, are discovered during runtime. Thus, the present invention mitigates relying on anticipating the possible runtime errors and testing substantially all combinations, and then detecting unforeseen errors during runtime, which can be resource and time expensive.

In addition, the present invention affords consistent and clean stored procedure calling code since the code is generated and not generated manually by various developers who can impose coding styles and nuances. Thus, the present invention implicitly provides the opportunity to develop a coding standard that promotes efficiency, ease of debugging, and good manufacturing practices.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 4 is a list of attribute names and parameters in accordance with an aspect of the present invention.

DETAILED DESCRIPTION OF THE INVENTION

Figure 1:
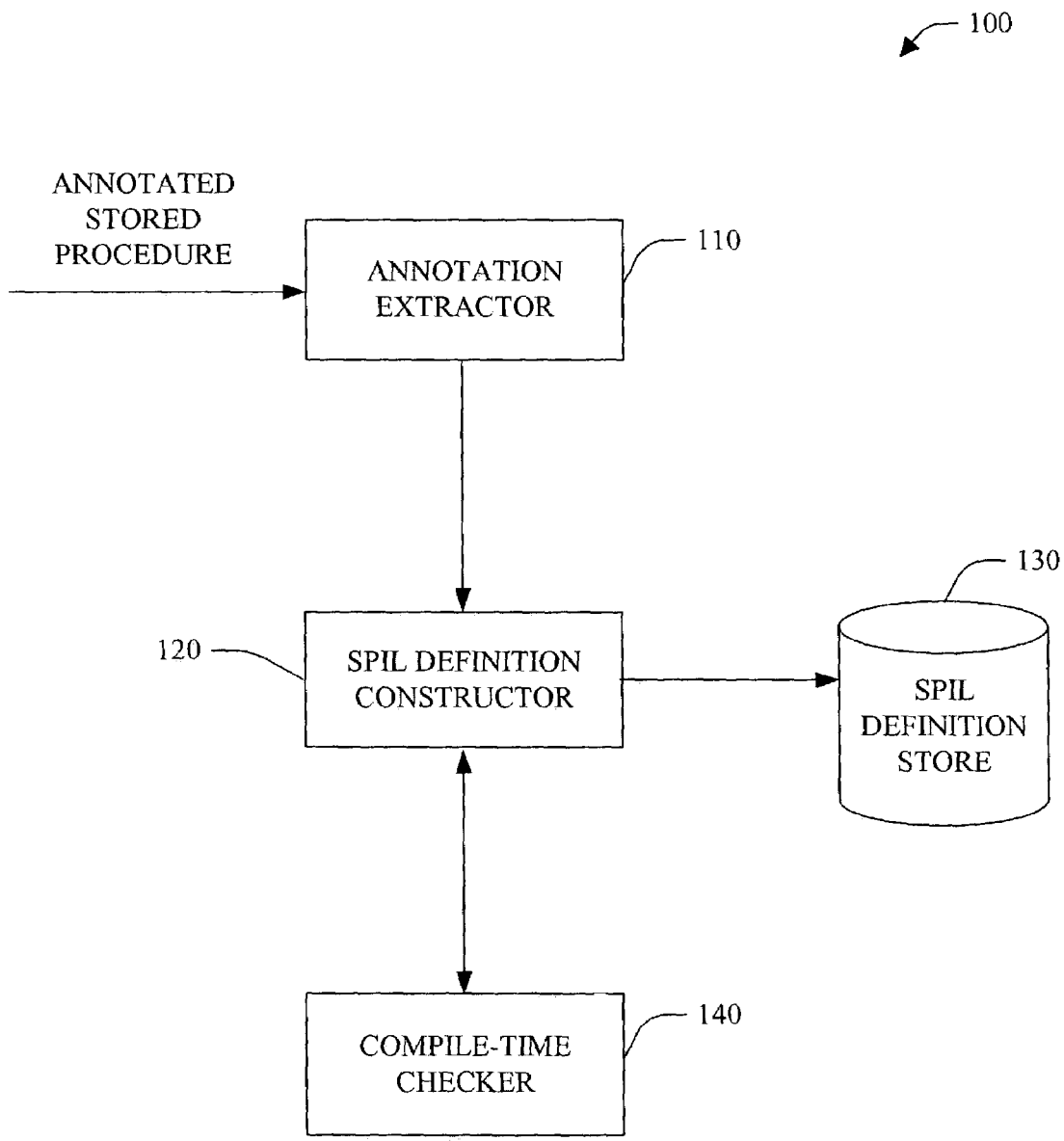
FIG. 1 is a block diagram of a SPIL compiler system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

It is noted that the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

The present invention relates to systems and methods to generate (e.g., automatically) code that executes a stored procedure within a database (e.g., SQL). The invention includes components to extract annotations from a stored procedure, utilize (e.g., compile with or without error checking) the annotations to create an intermediate file (e.g., XML based) that defines rights, bindings, etc., and generates high level code and associated libraries (e.g., C, C++, C#, Jscript .net, VB.net, Perl.net) from the intermediate file. The high level code and associated libraries can then be employed to invoke a stored procedure via calling the generated code from a user application. Those skilled in the art will recognize that that any suitable high level code can be employed in accordance with the present invention. It is to be appreciated any type of high level code suitable for carrying out the present invention can be employed and all such types of high level code are intended to fall within the scope of the hereto appended claims.

A developer inserts the annotation in the stored procedure while writing the stored procedure. The annotation can includes metadata indicating a desire to generate a method for the stored procedure, an algorithm to generate a function to execute on a logical partition, a partition and a class where the function resides, for example. The present invention is then employed to generate stored procedure calling code for the stored procedure via utilizing the annotations within the stored procedure. Thus, the present invention mitigates developing, debugging and testing stored procedure calling code via generating, with compile-time error checking, the stored procedure calling code; thereby reducing R&D resources, time and costs, and improving coding efficiency and consistency.

Referring to FIG. 1, a stored procedure interface language (SPIL) compiler system 100 in accordance with an aspect of the present invention is illustrated. The system 100 comprises an annotation extractor 110, and a SPIL definition constructor 120. Optionally, the system 100 can include a SPIL definition store 130 and/or a compile-time checker 140.

The SPIL compiler system 100 receives an annotated stored procedure, extracts annotation(s) and provides a SPIL definition of the annotated stored procedure as an output. For example, SPIL definition of the annotated stored procedure can be stored in the SPIL definition store 130. In one example, the SPIL definition store 130 stores SPIL definitions associated with a plurality of annotated stored procedures.

The system 100 utilizes the annotations within a stored procedure to facilitate generation of code (e.g., by a code generator (not shown)). In accordance with an aspect of the present invention, a developer writing a stored procedure includes annotation(s) in the stored procedure that define the developer's intent to generate stored procedure calling code. Exemplary annotations in accordance with an aspect of the present invention are described in greater detail below. After the developer has written the stored procedure, the stored procedure is placed in a database (not shown) and/or server (not shown). For example, the stored procedure can encompass a plurality of files that are uploaded, serially and/or concurrently (e.g., batch), to a SQL server and/or database. In another example, a database with annotated stored procedures can be generated through a build, and a binary (file) of the database can be created. The binary can then be mounted on a server during deployment instead of uploading files.

The annotation extractor 110 extracts the annotation(s) within a stored procedure (e.g., without altering the annotated stored procedure) and provides information associated with the extracted annotation(s) to the SPIL definition constructor 120. The SPIL definition constructor 120 utilizes the extracted annotation(s) to facilitate constructing a SPIL definition of the annotated stored procedure. For example, the SPIL definition can be XML-based. The SPIL definition thus functions as an intermediate language between an annotated stored procedure and generated code for invoking the stored procedure. The SPIL definition can further provide the stored procedure logical groupings.

In one example, the SPIL definition declaratively states a set of stored procedures and the stored procedure logical grouping(s). For example, a developer can define an abstraction (e.g., grouping) of a set of methods. The SPIL definition can include metadata to identify application grouping (e.g., an abstraction), a database connection string and a list of stored procedures that belong to the grouping. Additionally, for each stored procedure defined, the SPIL definition can include a list of parameters and type information.

Optionally, the system 100 can include a compile-time checker 140. The compile-time checker 140 can perform compile-time error checking of the annotated stored procedure. As noted above, conventionally, a stored procedure is simply referenced at compile time. Error(s) are typically resolved by testing foreseen permutation(s), and then relying on runtime to find unaccounted for error(s). Intensive testing and relying on runtime can introduce inefficiencies and consume time and resource(s). The compile-time checker 140 can include, for example, enable and/or disable option(s) that can be set through command line switch(es), bit setting and/or any known technique. Compile-time error checking can mitigate reliance on anticipation of potential runtime error(s) (e.g., parameter and/or partitioning mismatch), testing of substantially all combinations, and then detecting unforeseen errors during runtime, which can be resource and time expensive.

While FIG. 1 is a block diagram illustrating components for the SPIL compiler system 100, it is to be appreciated that the SPIL compiler system 100, the annotation extractor 110, the SPIL definition constructor 120, the SPIL definition store 130 and/or the compile-time checker 140 can be implemented as one or more computer components, as that term is defined herein. Thus, it is to be appreciated that computer executable components operable to implement the SPIL compiler system 100, the annotation extractor 110, the SPIL definition constructor 120, the SPIL definition store 130 and/or the compile-time checker 140 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 2:
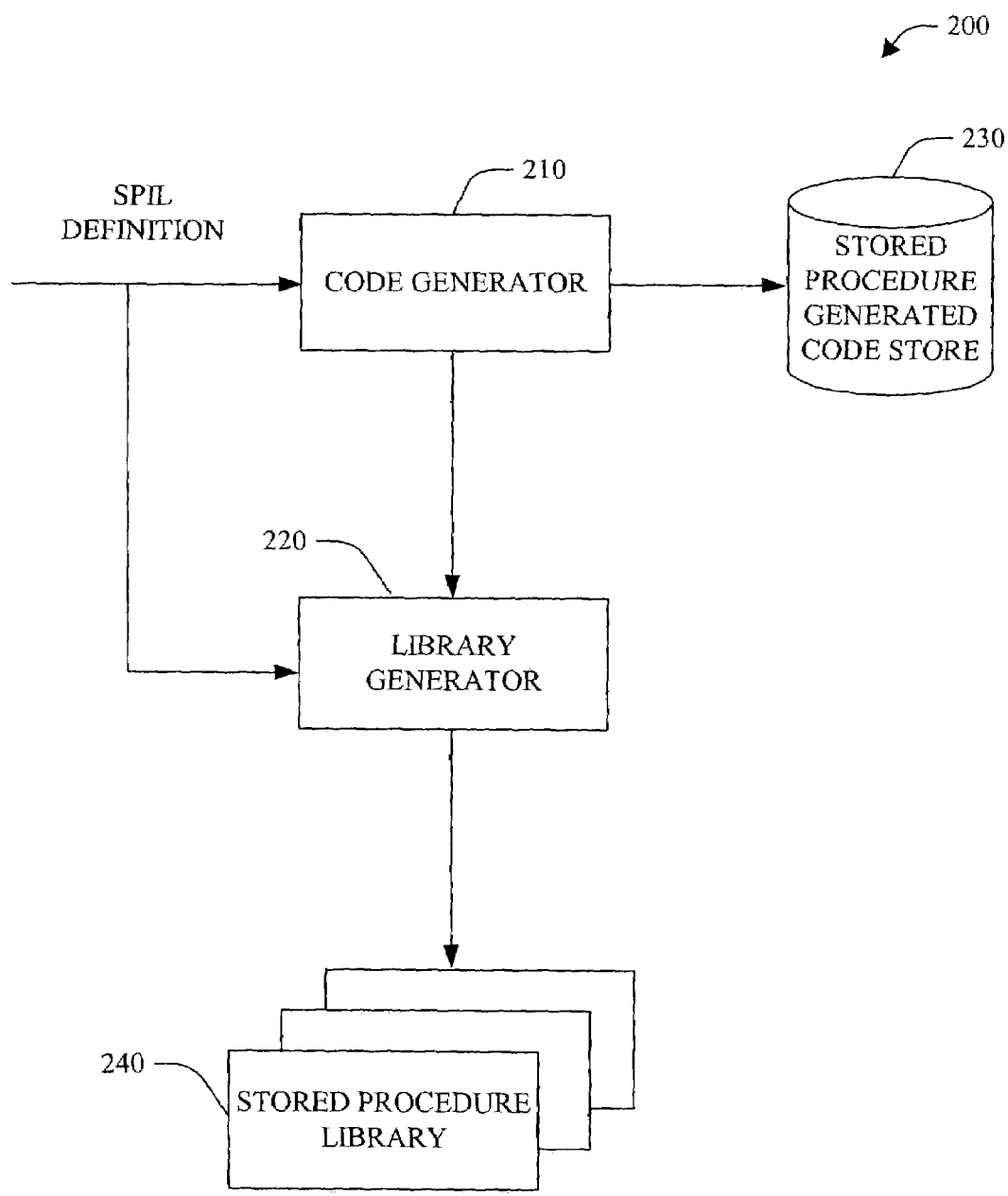
FIG. 2 is a block diagram of a SPIL generator system in accordance with an aspect of the present invention.

Turning to FIG. 2, a SPIL generator system 200 in accordance with an aspect of the present invention is illustrated. The system 200 comprises a code generator 210 and a library generator 220. Optionally, the system 200 can include a stored procedure generated code store 230 and/or a stored procedure library 240.

The system 200 receives a SPIL definition (e.g., from a SPIL compiler system 100 and/or SPIL definition store 130). The SPIL definition functions as an intermediate between a stored procedure and the generated code for invoking the stored procedure, and can further provide the set of stored procedures and the stored procedure logical groupings. The system 200 produces code and libraries associated with the SPIL definition to call a stored procedure.

The code generator 210 receives the SPIL definition (e.g., from the compiler system 100 and/or SPIL definition store 130) and produces code (e.g., object code) with the SPIL definition to call a stored procedure. The code can be generated employing various techniques. For example, in one aspect of the present invention, the code can be organized within namespaces. As known, a namespace can be utilized as a scoping means, for example within the context of a class library. Then, the stored procedures can be grouped to define a class. A stored procedure will typically map to a method within the class. The generated method can expose the parameters as defined in the stored procedure, and can pack the parameters and call the stored procedure employing a shared SPIL runtime. In another aspect, a predefined hierarchy organizing by database can be employed. The code generator 210 can translate the SPIL definition (e.g., based on the annotation(s) of the annotated stored procedure), and produce verified and usable logic, or high-level code that can be compiled into application code.

The library generator receives the SPIL definition (e.g., from the compiler system 100 and/or SPIL definition store 130) and produces library(ies) associated with the SPIL definition to call the stored procedure.

It is to be appreciated that the SPIL generator system 200, the code generator 210, the library generator 220, the stored procedure generated code store 230 and/or the stored procedure library 240 can be computer components as that term is defined herein.

Figure 3:
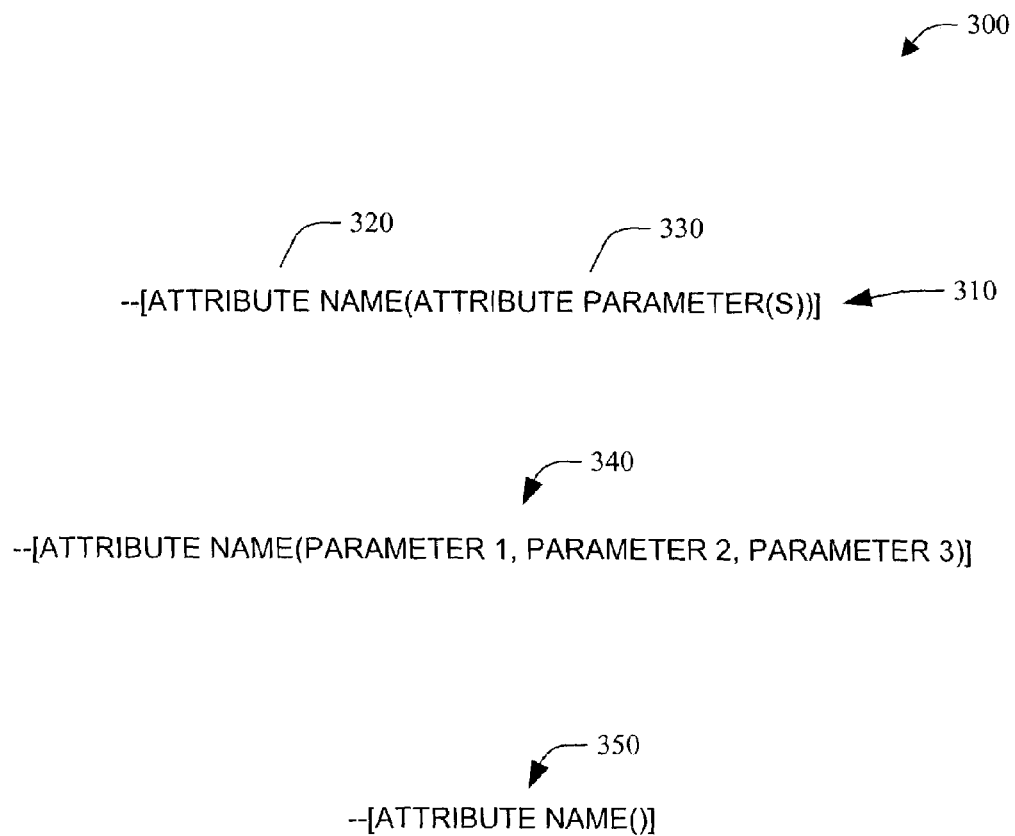
FIG. 3 illustrates exemplary stored procedure annotation syntax in accordance with an aspect of the present invention.

FIGS. 3 and 4 provide exemplary stored procedure annotation syntax in accordance with an aspect of the present invention. It is to be appreciated that the following examples do not limit the invention, and are provided to facilitate in understanding of the invention. Thus, in accordance with an aspect of the present invention, additional and/or other attribute(s) can be employed. Further, various ordering of the attributes relative to one another can be employed in accordance with an aspect of the present invention.

Next, referring to FIG. 3, an exemplary annotation syntax 300 in accordance with an aspect of the present invention is illustrated. Stored procedure annotation syntax 300 includes one or more attributes, wherein an attribute is a metadata set associated with a stored procedure. The attribute(s) are utilized alongside stored procedure definition. The attribute(s) are accessible, and can be utilized for various purposes. For example, an attribute can identify method(s) to be exported. The two dashes (--) preceding the attribute is an exemplary syntax (e.g., T-SQL comment syntax) in acc. Those skilled in the art will recognize that that any suitable attribute can be employed in accordance with the present invention. It is to be appreciated any type of attribute syntax suitable for carrying out the present invention can be employed and all such types of attribute syntax are intended to fall within the scope of the hereto appended claims.

The stored procedure annotation syntax 300 provides for an attribute 310 to include an attribute name 320 and, optionally, associated attribute parameter(s) 330. The attribute parameter(s) 330 comprise N parameters, where N is an integer equal to or greater than zero. In one example, N equals three wherein the stored procedure annotation syntax 340 includes three parameters: parameter 1, parameter 2, and, parameter 3 as arguments. In another example, N equals zero wherein parameter arguments are not employed, as depicted in stored procedure annotation syntax 350. The stored procedure annotation syntax 350 illustrates an example in which a set of empty parentheses is employed when no parameter argument is passed. Additionally and/or alternatively, the attribute name without parentheses can be utilized when no parameter argument is passed. Generally, an annotation is included, for example, by a developer prior to creation of the SPIL definition associated with the annotated stored procedure, and one or more annotations can be employed.

Turning next to FIG. 4, an exemplary list 400 of attribute names and parameters in accordance with an aspect of the present invention are illustrated. The list 400 is for purposes of illustration and is not intended to limit the present invention. Those skilled in the art will recognize that any suitable attribute name and/or parameter can be employed in accordance with the present invention. It is to be appreciated any type of attribute name and/or parameter suitable for carrying out the present invention can be employed and all such types of attribute name(s) and/or parameter(s) are intended to fall within the scope of the hereto appended claims. The list 400 includes an attribute name field 410, an attribute parameter(s) field 420 and a description field 430.

A method attribute 440 can be employed to request a SPIL tool (e.g., a SPIL compiler system 100 and/or a SPIL generator system 200)) to generate a method for the annotated stored procedure, and, to indicate that the method can be exposed to a high-level language through binding. The method attribute 440 does not have an associated attribute parameter.

A class attribute 450 can be employed to notify the SPIL tool to generate a function inside a custom class indicated through the class name parameter. The class attribute 450 has a class name parameter associated with it. The class specified in the class name parameter can be, for example, a logical unit within the high-level language that represents a logical entity. The class attribute 450 affords grouping of a set of methods within a class for high-level language accessibility. For example, if multiple stored procedures are annotated with similar class names, then they can be grouped together. A rights attribute 460 can be employed to assign read and/or write access.

Data can be partitioned, for example, logically, physically, temporally and/or spatially. A PartitionBy attribute 470 can be employed to request the SPIL tool generate a function to execute on a specific logical partition. The PartitionBy attribute 470 can have an algorithm and/or a partition identifier as a parameter. The algorithm parameter can be used to indicate a name of a hash function. The partition identifier parameter can be used to specify the parameter(s) utilized in the stored procedure to calculate a logical partition identification. The SPIL tool can utilize the parameter(s) to ensure the partition algorithm is meaningful.

A PartitionAll attribute 480 requests the SPIL tool to generate a function to execute on substantially all physical partitions. The PartitionAll attribute 480 does not have an associated attribute parameter.

A PartitionAny attribute 490 requests the SPIL tool to generate a function to execute on any physical instance identification. The PartitionAny attribute 490 does not have an associated attribute parameter.

The call by identification attribute 494 requests the SPIL tool to generate a function to execute on a specific physical instance identification. The call by identification attribute 494 does not have an associated attribute parameter.

In one example, the PartitionBy attribute 470, the PartitionAll attribute 480, the PartitionAny attribute 490 and the call by identification attribute 494 are mutually exclusive, that is, no more than one of them can be employed within a particular annotated stored procedure.

For example, an exemplary portion of an annotated stored procedure in accordance with an aspect of the present invention provides:

TABLE 1

--[Method]
--[class(x)]
--[rights(read)]
--[PartitionBy(y, z)]
CREATE PROCEDURE Example_1
( TABLE 1-continued code associated with stored procedure Example_1
)

Table 1 includes annotations as described above. In particular, the portion of the stored procedure comprises a method attribute, a class attribute with a parameter "x", a rights attribute with a "read" parameter, and, a PartitionBy attribute 470 with parameters "y" and "z". The attributes indicate that this method should be exported, that language binding should be created in the class x, that read privileges are available, and that the database instance is resolved using the hash function y and partition identification z.

Next, another exemplary portion of an annotated stored procedure in accordance with an aspect of the present invention provides:

TABLE 2

--[Method]
--[class(a)]
--[PartitionAny]
CREATE PROCEDURE Example_2
(
code associated with stored procedure Example_2

Table 2 includes annotations as set forth previously. In particular, the portion of the stored procedure illustrated includes annotations comprising a method attribute, a class attribute with a parameter "a", and a partition any attribute. The attributes indicate that this method should be exported, that language binding should be created in the class a, and that any database instance can be utilized.

The example of Table 2 does not include a rights attribute; however, in one example, a default attribute can be employed when an attribute is not included in the annotation. For example, default rights can be read-only wherein not including the rights attribute indicates read-only privileges. Likewise, default attributes can be employed with one or more other annotation attributes. Further, it is to be appreciated that the system and method of the present invention can be employed with partitioned and/or non-partitioned system(s).

Figure 5:
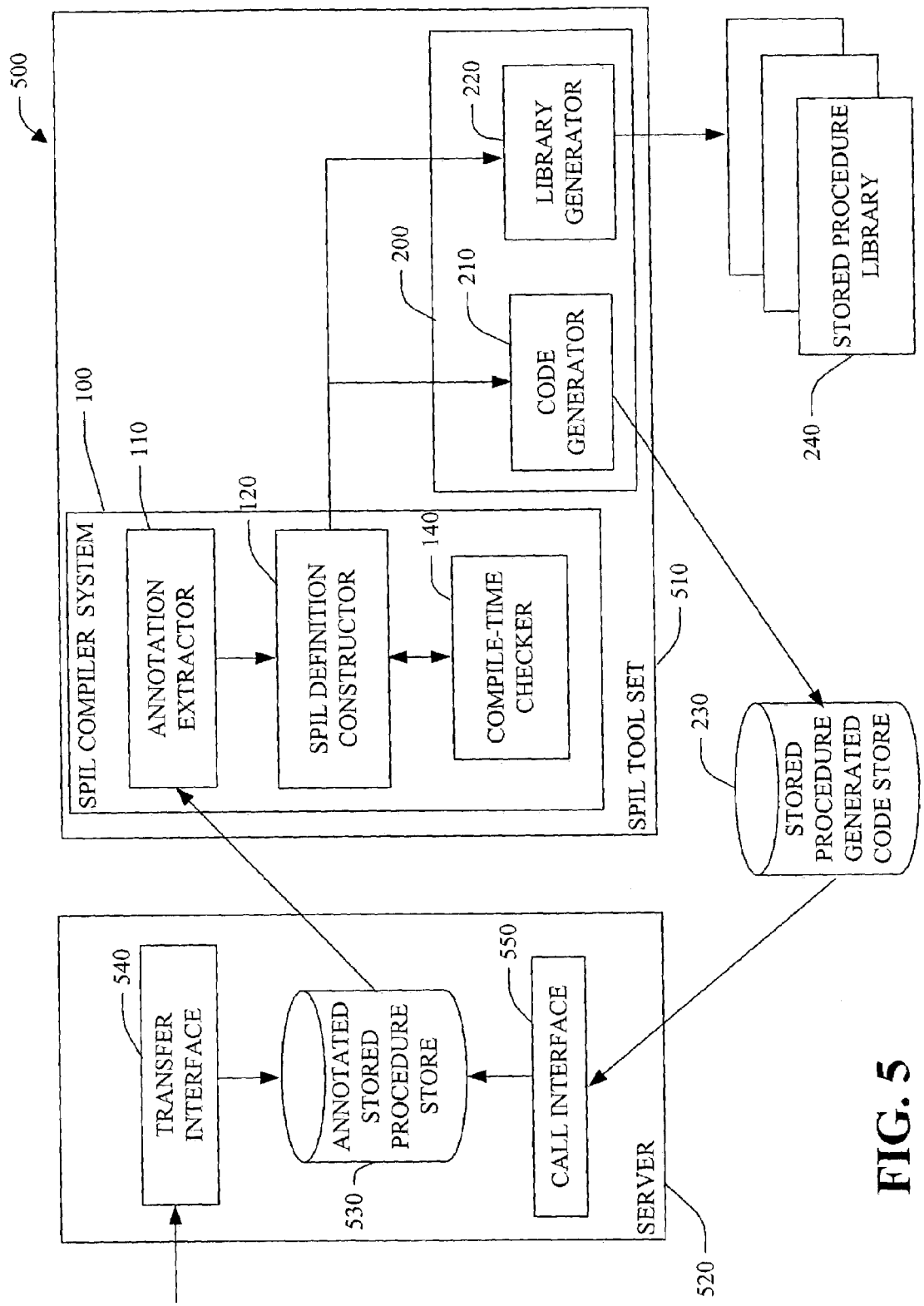
FIG. 5 is a block diagram of a stored procedure code generation system in accordance with an aspect of the present invention.

Turning to FIG. 5, a stored procedure code generation system 500 in accordance with an aspect of the present invention is illustrated. The system 500 comprises a SPIL tool set 510 and, optionally, a server 520. The SPIL tool set 510 includes a SPIL compiler system 100 and a SPIL generator system 200. The server 520 includes an annotated stored procedure store 530.

The server 520 can be an SQL server with one or more SQL databases, or any server and/or database wherein a stored procedure can be saved and invoked. The server 520 is operative to the SPIL tool set 510 to provide the SPIL tool set 510 with access to the annotated stored procedures store 530. The server 520 can additionally provides a transfer interface 540 for transferring annotated stored procedures to the server 520, and/or a call interface 550 for invoking a stored procedure residing in the server 520.

The transfer interface 540 can be utilized, for example, by a developer writing annotated stored procedure(s). The annotation in a stored procedure can include the annotation and associated attributes described above. The annotation included in a stored procedure declaratively indicates the developer's intent to bind the stored procedure to high-level code (e.g., a method(s)). The annotation can further indicate the method, a class where the method resides, read/write privileges, and partition information, for example.

The call interface 550 can be employed to call an annotated stored procedure via employing generated high-level code that was generated by the SPIL tool set 510 from the annotated stored procedures store 530. Generally, the generated code is complied to form application code, wherein a client application can call the stored procedure via the application code to invoke the stored procedure. Conventionally, the developer can write a call to a stored procedure after writing the stored procedure. The present invention mitigates consuming developer time and effort by generating (e.g., automatically) the call to the stored procedure.

As noted above, the SPIL tool set 510 comprises the SPIL compiler system 100 and a SPIL generator system 200. The SPIL compiler system 100 can receive annotated stored procedure(s) from the annotated stored procedure store 530. In one example, an external trigger (not shown) from a developer notifies the SPIL tool set 510 that an annotated stored procedure is available to utilize to generate stored procedure calling code. In another example, the server 520 notifies the SPIL tool set 510 that an annotated stored procedure is available. In yet a third example, the SPIL tool set 510 periodically polls the server 520 to determine if an annotated stored procedure is available. It is to be appreciated that the aforementioned techniques do not limit the invention and that any known notification technique can be employed in accordance with the present invention.

After receiving an annotated stored procedure, the SPIL tool set 510 utilizes annotation(s) to facilitate generating stored procedure calling code. The SPIL compiler system 100 compiles code to generate intermediate code in stored procedure interface language (SPIL) definition (e.g., XML-based language). The SPIL compiler system 100 can optionally further employ error checking during compilation via the compile-time checker 140.

The SPIL definition is then utilized by the SPIL generation system 200 to generate stored procedure calling code, for example, stored in the stored procedure generated code store 230 and/or associated stored procedure library(ies) 240 (e.g., C, C++, C#, Jscript.net, VB.net and/or Perl.net). The generated stored procedure calling code and the associated libraries can be accessible to application code, and can be employed to invoke the stored procedure within the server 520 (e.g., runtime library(ies) for calling the stored procedure(s)). Thus, the present invention mitigates developing, debugging and testing code to call a stored procedure, thereby reducing development time and improving development efficiency. In addition, consistent and clean stored procedure calling code will be generated, and can be employed as a coding standard.

Figure 6:
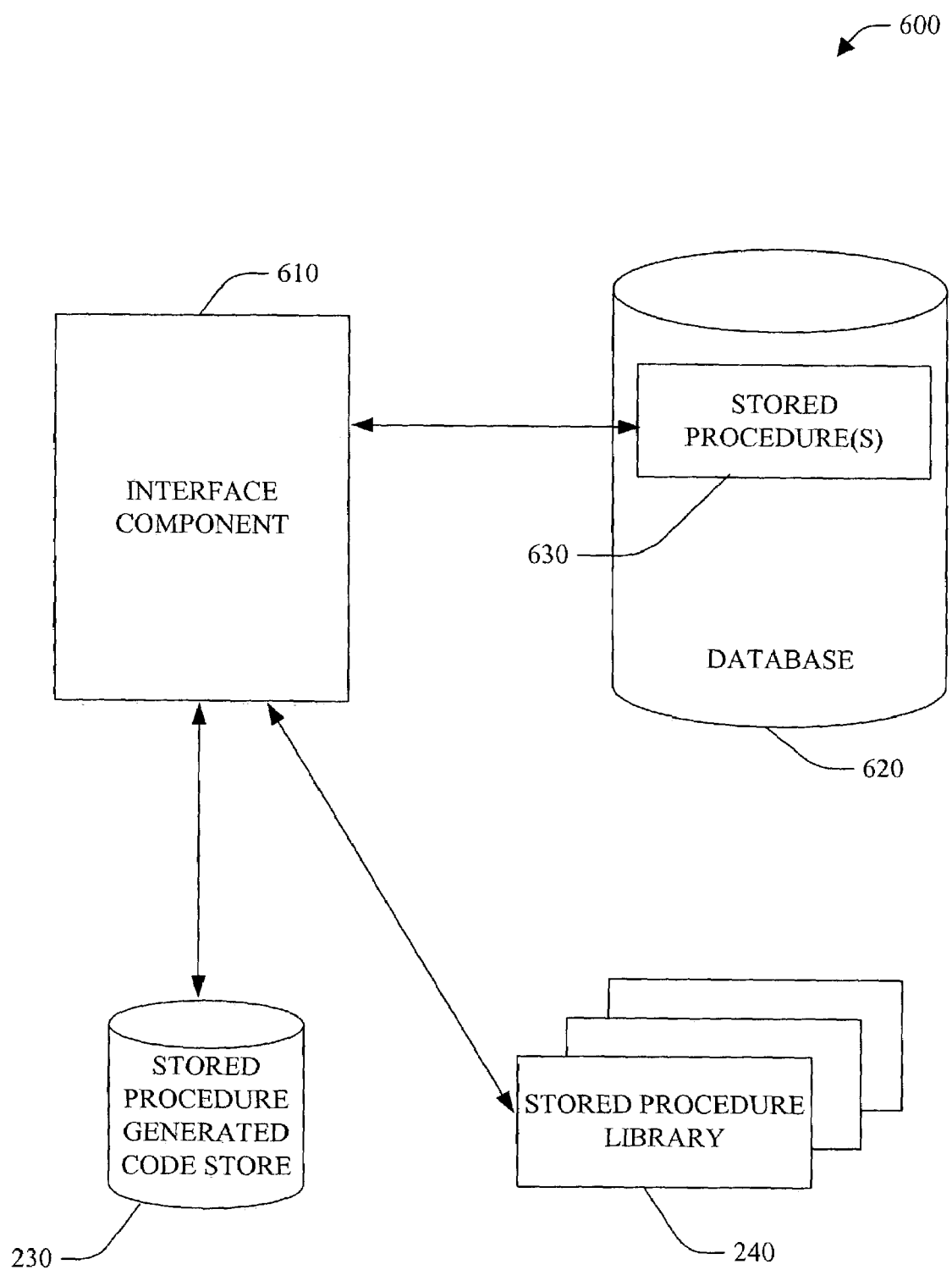
FIG. 6 is a block diagram of a stored procedure invocation system in accordance with an aspect of the present invention.

Next, referring to FIG. 6, a stored procedure invocation system 600 in accordance with an aspect of the present invention is illustrated. The system 600 includes an interface component 610, a database 620 having stored procedure(s) 630. The system 600 further includes a stored procedure generated code store 230 and/or a stored procedure library 240. The system 600 facilitates access to generated stored procedure calling code (e.g., to client applications).

Generally, stored procedure(s) are saved in a server (or database) wherein the stored procedures can be called from an application. Conventionally, a developer writes a stored procedure, and then writes the code to call the stored procedure. In accordance with an aspect of the present invention, a developer can include annotation(s) as set forth supra within the stored procedure to mitigate writing corresponding stored procedure calling code, wherein the annotations are utilized to generate (e.g., automatically) stored procedure calling code.

The annotated stored procedure can then be transferred to a server, and a stored procedure interface language tool set 510 (SPILT), in accordance with the invention, can be employed to generate the stored procedure calling code (e.g., in the stored interface language (SPIL) or other suitable XML-based language) utilizing the annotation(s) within the stored procedure. The generated stored procedure calling code can then be made accessible to application(s), and employed to invoke a stored procedure within the server.

The interface component 610 can be utilized for uploading a stored procedure to the database 620 (or server) and downloading a stored procedure from the database 620. Typically, after an annotated stored procedure is written, tested and debugged, it is transferred (e.g., uploaded), employing interface component 610, to the database 620 wherein it can be stored in the stored procedure(s) 630 and to generate stored procedure calling code and/or be called.

The interface component 610 can further be employed to interface application(s) with (1) generated stored procedure calling code stored in the stored procedure generated code store 230 and/or (2) the stored procedure library 240. Typically, the application code interacts with the generated code to instantiate a generated class, and then the application code invokes (e.g., via a calling function) a stored procedure in the server (not shown). The interface component 610 facilitates connection management between the calling function and the stored procedure in the server to provide a physical connection, to execute the stored procedure, and optionally to provide enumeration of physical connection(s). Thus, the interface component 610 mitigates the application code from having knowledge regarding the physical connection. In addition, a layer of security can be provided to shield the application code from obtaining the actual physical identifier.

It is to be appreciated that various connection management model(s) can be employed in accordance with the present invention. For example, connection management models (e.g., off-the-shelf and proprietary) to connect to one or more database servers with one or more partitions on the one or more database servers can be employed. In one aspect of the present invention, the connection management employed by the interface component 610 provides connections for supplied parameter (e.g., store name and logical hash value) combinations. Generally, a look-up table or logical calculations can be employed to perform a virtual-to-physical connection mapping. Then a connection string can be formed to establish the connection for the supplied parameter combination. Various techniques can be employed to mitigate the cost associated with establishing the connection when substantially similar parameters are subsequently supplied. For example, caching object instances can be employed to reduce the cycles required to create and destroy similar objects. In another aspect of the present invention, enumeration of all physical instances for a given logical database can be employed. For example, enumeration keys for physical instances can be provided. The enumeration keys can be accessible to a stored procedure call that is tagged with physical calling attributes.

The stored procedure library 240 can provide classes that can be instantiated and employed to invoke stored procedures within the database 620.

Turning briefly to FIGS. 7, 8, 9 and 10 that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 7:
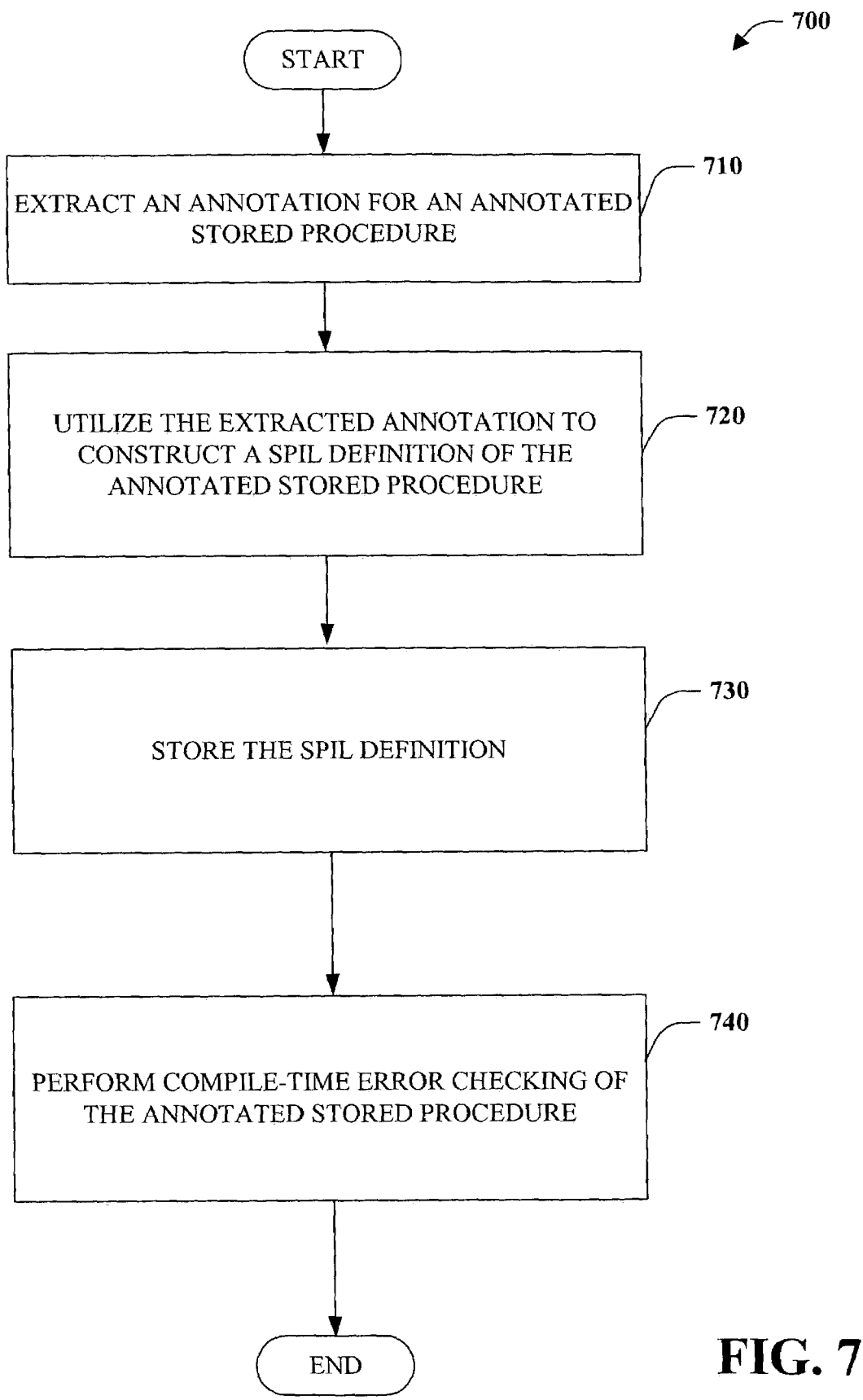
FIG. 7 is a flow chart of a method of providing a SPIL compilation of an annotated stored procedure in accordance with an aspect of the present invention.

Referring to FIG. 7, a method of providing a SPIL compilation of an annotated stored procedure 700 in accordance with an aspect of the present invention is illustrated. At 710, an annotation is extracted from the annotated stored procedure. The annotation can include an attribute name, for example, a method attribute, a class attribute, a rights attribute, a partition by attribute, a partition all attribute, a partition any attribute and/or a call by identification attribute. In one example, substantially all annotations are extracted from the annotated stored procedure.

At 720, the extracted annotation is utilized to construct a SPIL definition of the annotated stored procedure. For example, the SPIL definition can declaratively identify a set of annotated stored procedures and/or a logical grouping of a set of annotated stored procedures. The SPIL definition can be XML-based.

At 730, the SPIL definition is stored, for example, in a SPIL definition store. At 740, compile-time error checking of the annotated stored procedure is performed. For example, the compile-time error checking can be performed when a client calls the stored procedure.

Figure 8:
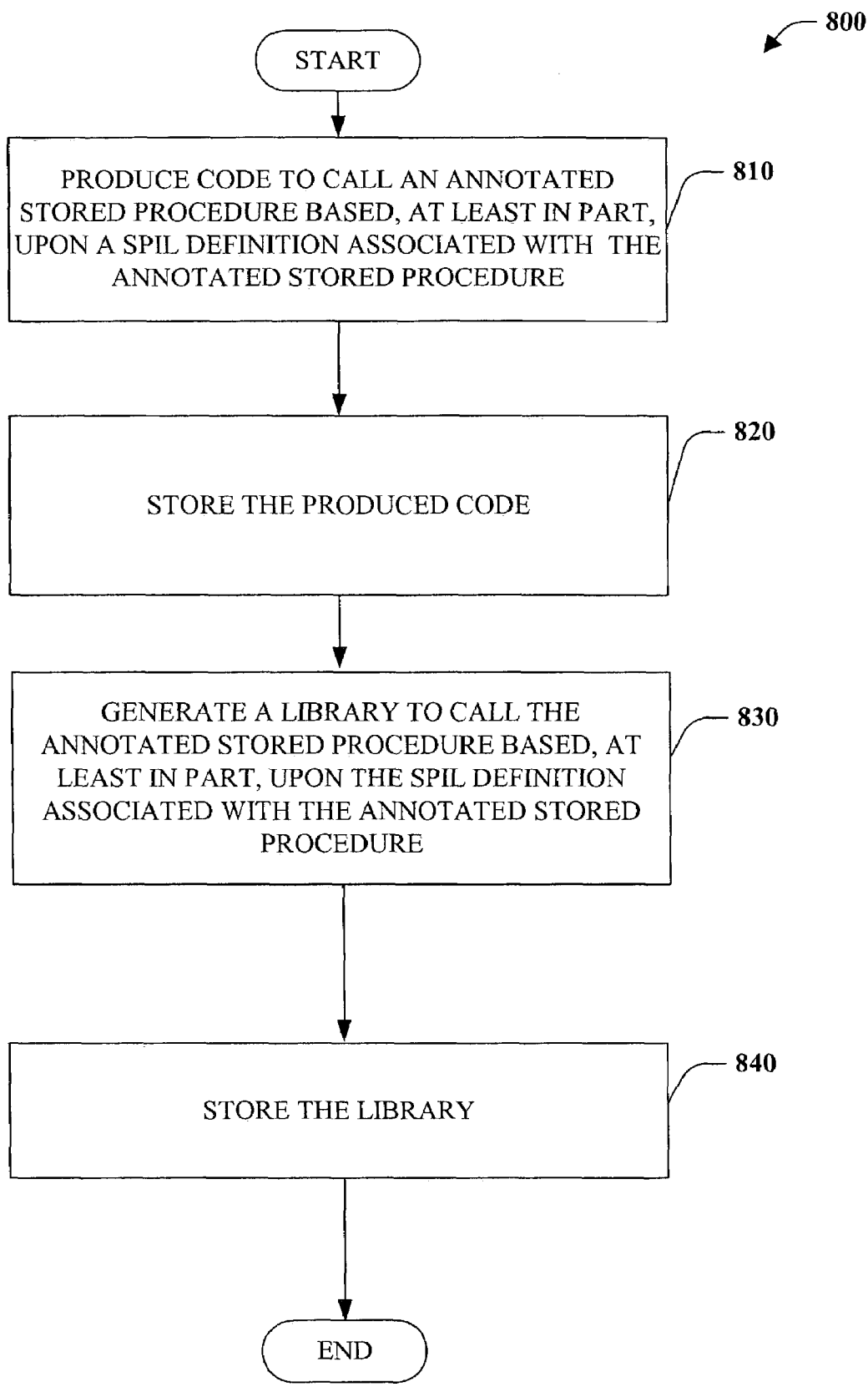
FIG. 8 is a flow chart of a method of producing code to call an annotated stored procedure in accordance with an aspect of the present invention.

Turning to FIG. 8, a method of producing code to call an annotated stored procedure in accordance with an aspect of the present invention is illustrated. At 810, code to call the annotated stored procedure is generated produced based, at least in part, upon a SPIL definition of the annotated stored procedure. At 820, the produced code is stored, for example, in a stored procedure generated code store.

At 830, a library to call the annotated stored procedure is generated based, at least in part, upon the SPIL definition. At 840, the library is stored, for example, in a stored procedure library. For example, the library can be associated with the C, C++, C#, Jscript.net, VB.net and/or Perl.net programming languages (e.g., runtime library(ies) for calling the stored procedure(s)).

Figure 9:
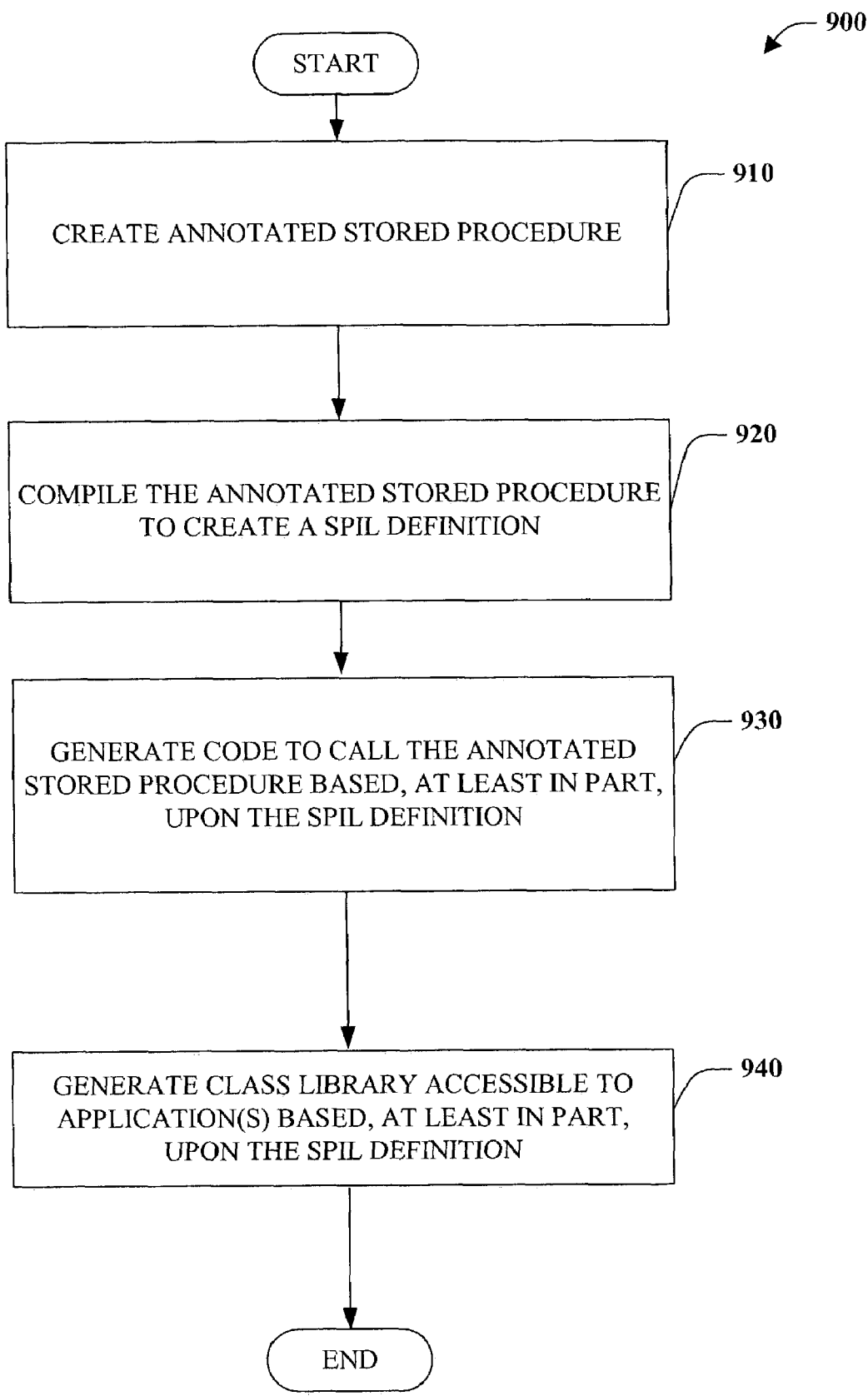
FIG. 9 is a flow chart of a method to generate stored procedure calling code in accordance with an aspect of the present invention.

Next, referring to FIG. 9, a method to generate stored procedure calling code 900 in accordance with an aspect of the present invention. At 910, an annotated stored procedure is created (e.g., by a programmer writing a stored procedure and including annotation(s). The annotation(s) declare the programmer's intent to have stored procedure calling code generated. For example, the programmer can transfer the annotated stored procedure to a server and/or database.

At 920, the annotated stored procedure is compiled to create a SPIL definition (e.g., by a SPIL compiler system 100). At 930, code to call the annotated stored is generated based, at least in part, upon the SPIL definition (e.g., by a SPIL code generation system 200). At 940, a class library accessible to application(s) is generated based, at least in part, upon the SPIL definition.

Figure 10:
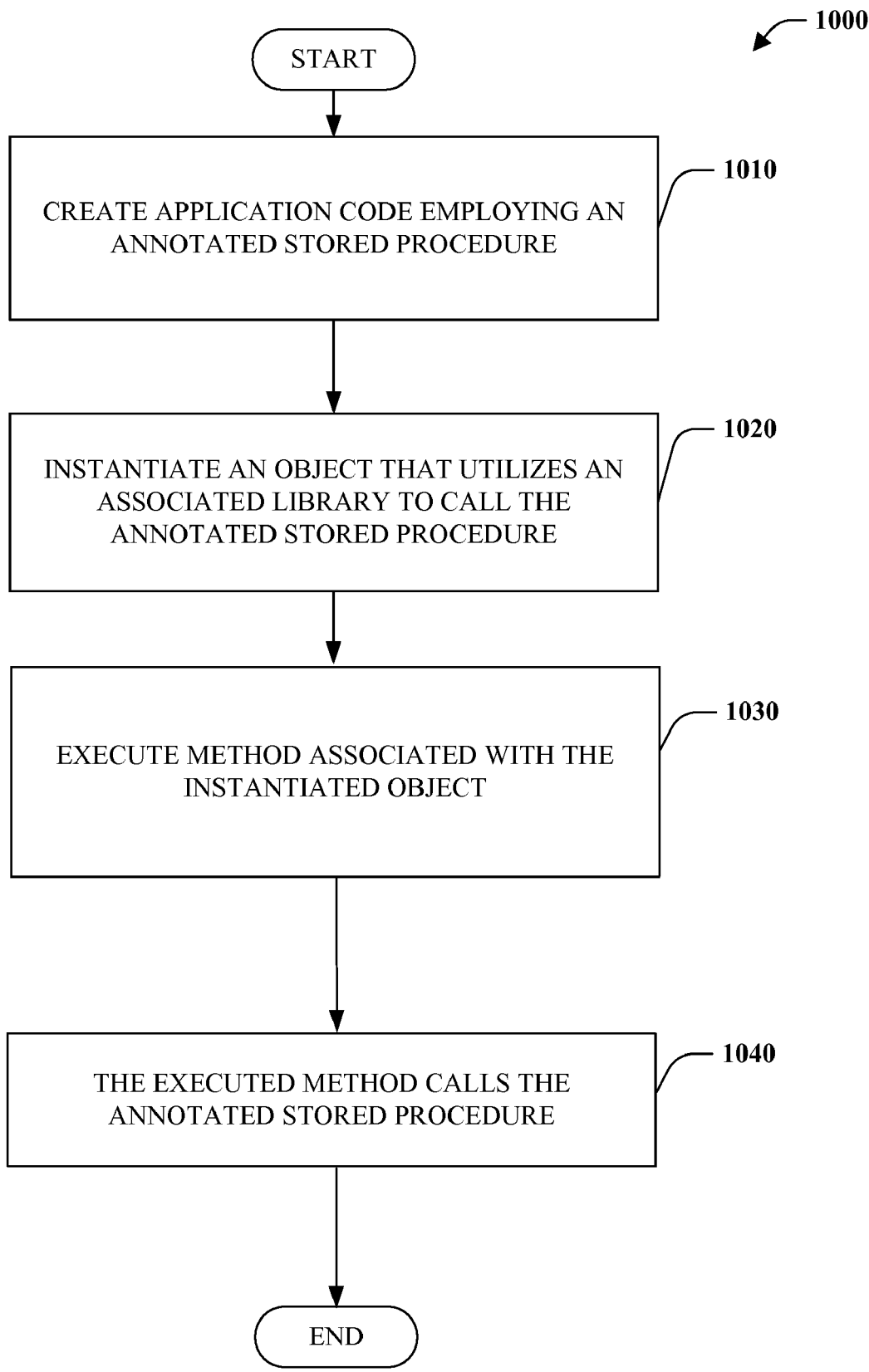
FIG. 10 is a flow chart of a method of utilizing generated stored procedure calling code in accordance with an aspect of the present invention.

Referring to FIG. 10, a method of utilizing generated stored procedure calling code 1000 in accordance with an aspect of the present invention is illustrated. At 1010, application code is created that includes employing an annotated stored procedure. For example, the annotated stored procedure can be called utilizing a class library that was generated from annotations included in the annotated stored procedure (e.g., by a SPIL tool set 510).

At 1020, an object that utilizes a library associated with the annotated stored procedure is instantiated. At 1030, a method associated with the object instance is executed. At 1040, the executed method calls the annotated stored procedure.

Figure 11:
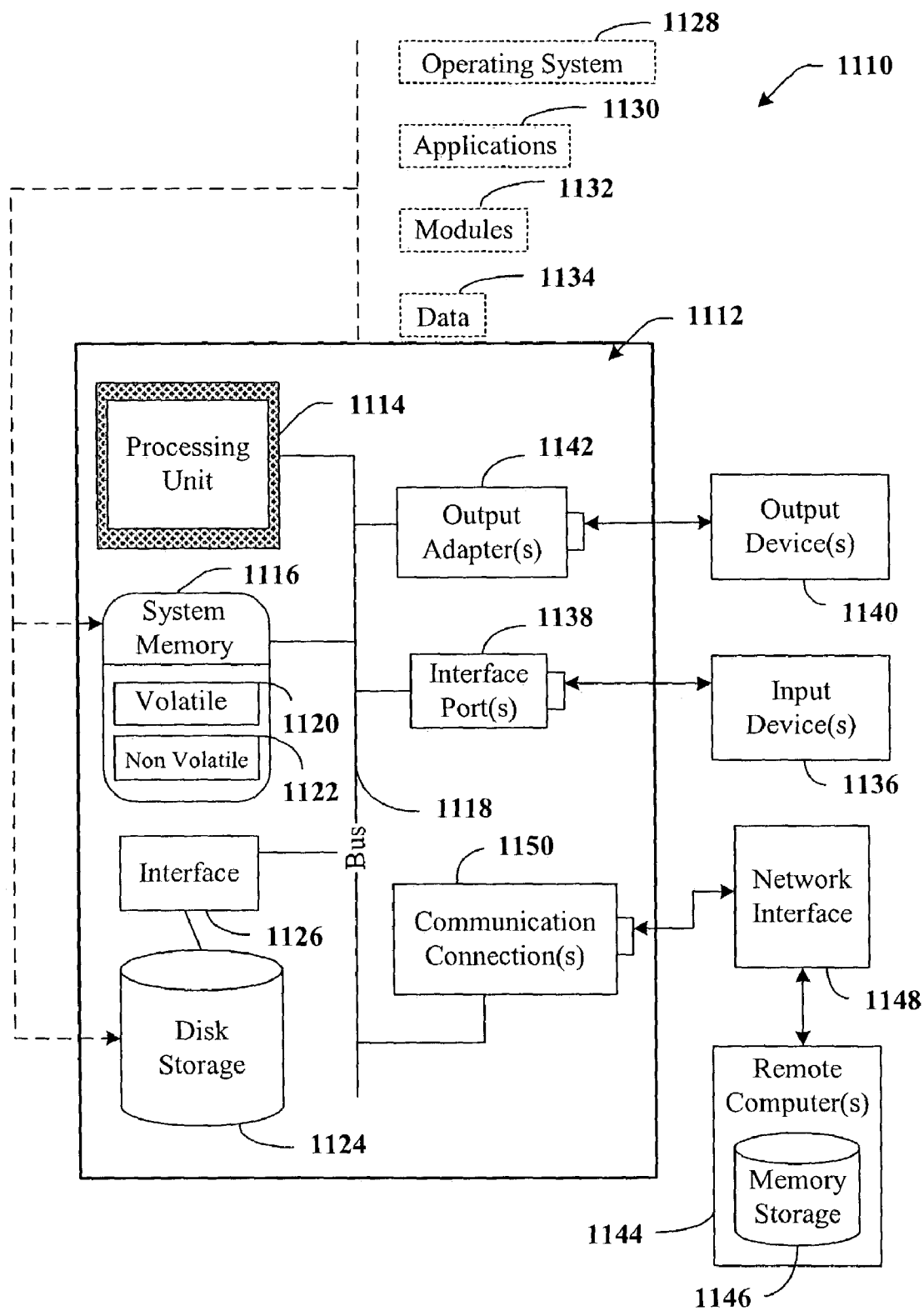
FIG. 11 illustrates an example operating environment in which the present invention may function.

In order to provide additional context for various aspects of the present invention, FIG. 11 and the following discussion are intended to provide a brief, general description of a suitable operating environment 1110 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A stored procedure interface language compiler and code generator system comprising:
   an annotation extractor that extracts an annotation from an annotated database management system stored procedure, the stored procedure includes at least one annotation;
   a stored procedure interface language definition constructor that utilizes the extracted annotation to construct a stored procedure interface language definition of the annotated database management system stored procedure;
   a code generator that generates code to call the annotated database management system stored procedure based, at least in part, upon the stored procedure interface language definition; and
   a library generator that creates a library to call the annotated database management system stored procedure based, at least in part, upon the stored procedure interface language definition.

2. The system of claim 1, the annotation comprises an attribute name.

3. The system of claim 2, the annotation further comprises an attribute parameter associated with the attribute name.

4. The system of claim 2, the attribute name is at least one of a method attribute, a class attribute, a rights attribute, a PartitionBy attribute, a PartitionAll attribute, a PartitionAny attribute and a call by identification attribute.

5. The system of claim 1, further comprising a stored procedure interface language definition store that stores the stored procedure interface language definition of the annotated database management system stored procedure.

6. The system of claim 1, further comprising a compile-time checker that performs compile-time error checking of the annotated database management system stored procedure.

7. The system of claim 1, the stored procedure interface language definition declaratively identifies a set of annotated database management system stored procedures.

8. The system of claim 1, the stored procedure interface language definition declaratively identifies a logical grouping of a set of annotated database management system stored procedures.

9. The system of claim 1, the stored procedure interface language definition is XML-based.

10. A stored procedure interface language compiler and code generator system comprising:
an annotation extractor that extracts at least one annotation included in an annotated database management system stored procedure;
a stored procedure interface language definition constructor that utilizes the extracted annotation to create a stored procedure interface language definition of the annotated database management system stored procedure;
a code generator that receives the stored procedure interface language definition, and produces code associated with the stored procedure interface language definition to call the annotated database management system stored procedure; and
a library generator that receives the stored procedure interface language definition, and produces a library associated with the stored procedure interface language definition to call the annotated database management system stored procedure.

11. The system of claim 10, the code generator stores the produced code in a stored procedure generated code store.

12. The system of claim 10, the library generator stores the library in a stored procedure library, the library is a runtime library facilitating calling of the annotated database management system stored procedure.

13. The system of claim 10, the library is associated with at least one of C, C++, C#, Jscript.net, VB.net and Perl.net programming language.

14. The system of claim 10, a plurality of annotated database management system stored procedures are grouped in a class.

15. A stored procedure code generation system comprising:
a computer implemented stored procedure interface language compiler system comprising an annotation extractor that extracts an annotation from an annotated database management system stored procedure, the stored procedure comprises annotated code, and a stored procedure interface language definition constructor that utilizes the extracted annotation to construct a stored procedure interface language definition of the annotated database management system stored procedure; and
a stored procedure interface language generator system comprising a code generator that receives the stored procedure interface language definition of the annotated database management system stored procedure, the stored procedure interface language generator system produces code associated with the stored procedure interface language definition to call the annotated database management system stored procedure; and
a library generator that receives the stored procedure interface language definition of the annotated database management system stored procedure and produces a library associated with the stored procedure interface language definition to call the annotated database management system stored procedure.

16. The system of claim 15, further comprising a server having an annotated database management system stored procedure store that stores the annotated database management system stored procedure.

17. The system of claim 16, the server further comprising a call interface employed to call the annotated database management system stored procedure based, at least in part, upon the produced code associated with the stored procedure interface language definition.

18. A method of providing a stored procedure interface language compilation of an annotated database management system stored procedure comprising:
extracting an annotation from the annotated database management system stored procedure;
utilizing the extracted annotation to construct a stored procedure interface language definition of the annotated database management system stored procedure;
generating code associated with the stored procedure interface language definition to call the annotated database management system stored procedure; and
creating a library associated with the stored procedure interface language definition to call the annotated database management system stored procedure.

19. The method of claim 18, the annotation comprises an attribute name.

20. The method of claim 19, the attribute name is at least one of a method attribute, a class attribute, a rights attribute, a PartitionBy attribute, a PartitionAll attribute, a PartitionAny attribute and a call by identification attribute.

21. The method of claim 18, further comprising at least one of the following acts:
storing the stored procedure interface language definition;
storing the stored procedure interface language definition in a stored procedure interface language definition file; and
performing compile-time error checking of the annotated database management system stored procedure.

22. The method of claim 18, the stored procedure interface language definition declaratively identifies a set of annotated database management system stored procedures.

23. The method of claim 18, the stored procedure interface language definition declaratively identifies a logical grouping of a set of annotated database management system stored procedures.

24. The method of claim 18, the stored procedure interface language definition is XML-based.

25. A method of producing code to call an annotated stored procedure comprising:
extracting an annotation included in an annotated database management system stored procedure;
utilizing the extracted annotation to construct a stored procedure interface language definition of the annotated database management system stored procedure;

producing code to call the annotated database management system stored procedure based, at least in part, upon the stored procedure interface language definition of the annotated database management system stored procedure; and generating a library to call the annotated database management system stored procedure based, at least in part, upon the stored procedure interface language definition.

26. The method of claim 25, further comprising at least one of the following acts:

storing the produced code in a stored procedure generated code store; and storing the library in a database management system stored procedure library.

27. The method of claim 25, the library is associated with at least one of C, C++, C#, Jscript.net, VB.net and Perl.net programming languages.

28. A computer readable medium storing computer executable components of a stored procedure interface language tool set, comprising:

a stored procedure interface language compiler component that comprises an annotation extractor component that extracts an annotation from an annotated database management system stored procedure;

a stored procedure interface language definition constructor component that utilizes the extracted annotation to construct a stored procedure interface language definition of the annotated database management system stored procedure; and a stored procedure interface language generator component that comprises a code generator component that receives the stored procedure interface language definition of the annotated database management system stored procedure, the stored procedure interface language generator component produces code associated with the stored procedure interface language definition to call the annotated database management system stored procedure; and a library generator component that receives the stored procedure interface language definition of the annotated database management system stored procedure and produces a library associated with the stored procedure interface language definition to call the annotated database management system stored procedure.

29. A stored procedure interface language tool set comprising:

means for extracting an annotation from an annotated database management system stored procedure;

means for constructing a stored procedure interface language definition utilizing the extracted annotation;

means for generating code to call the annotated database management system stored procedure based, at least in part, upon the stored procedure interface language definition; and means for generating a library to call the annotated database management system stored procedure based, at least in part, upon the stored procedure interface language definition.

30. A stored procedure interface invocation system comprising:

a stored procedure interface language compiler system that comprises:

an annotation extractor that extracts an annotation included in an annotated database management system stored procedure; and a stored procedure interface language definition constructor that utilizes the extracted annotation to construct a stored procedure interface language definition of the annotated database management system stored procedure;

a stored procedure interface language generator that comprises:

a code generator that generates stored procedure calling function code to call the annotated database management system stored procedure based, at least in part, upon the stored procedure interface language definition; and a library generator that generates a library to call the annotated database management system stored procedure based, at least in part, upon the stored procedure interface language definition of the annotated database management system stored procedure interface language definition;

a stored procedure generated code store that saves the generated store procedure calling function code for calling the annotated database management system stored procedure; and an interface component that facilitates connection management between an application code invoking a generated stored procedure calling function from the stored procedure generated code store and a database management system stored procedure.

31. The system of claim 30, the connection management comprising of at least one of providing a physical connection between the calling function and the database management system stored procedure, providing an enumeration of the physical connection, and executing the database management system stored procedure.

32. The system of claim 31, the enumeration of the physical connection employing one or more enumeration keys that can be accessible to a called database management system stored procedure that is tagged with a physical calling attribute.

33. The system of claim 30, the connection management comprises mitigating the application code from having to obtain knowledge regarding the physical connection.

34. The system of claim 30, the connection management comprises providing a security layer by shielding the application code from access to the actual physical identifier.

35. The system of claim 30, the connection management employs at least one of an off-the-shelf model and a proprietary model to connect to one or more database servers with one or more partitions on the one or more database servers.

36. The system of claim 30, the connection management establishes a connection based at least in part on a supplied parameter combination.

* * * * *